No. 625,956. Patented May 30, 1899.
W. KNAPP.
THILL COUPLING.
(Application filed Feb. 27, 1899.)
(No Model.)
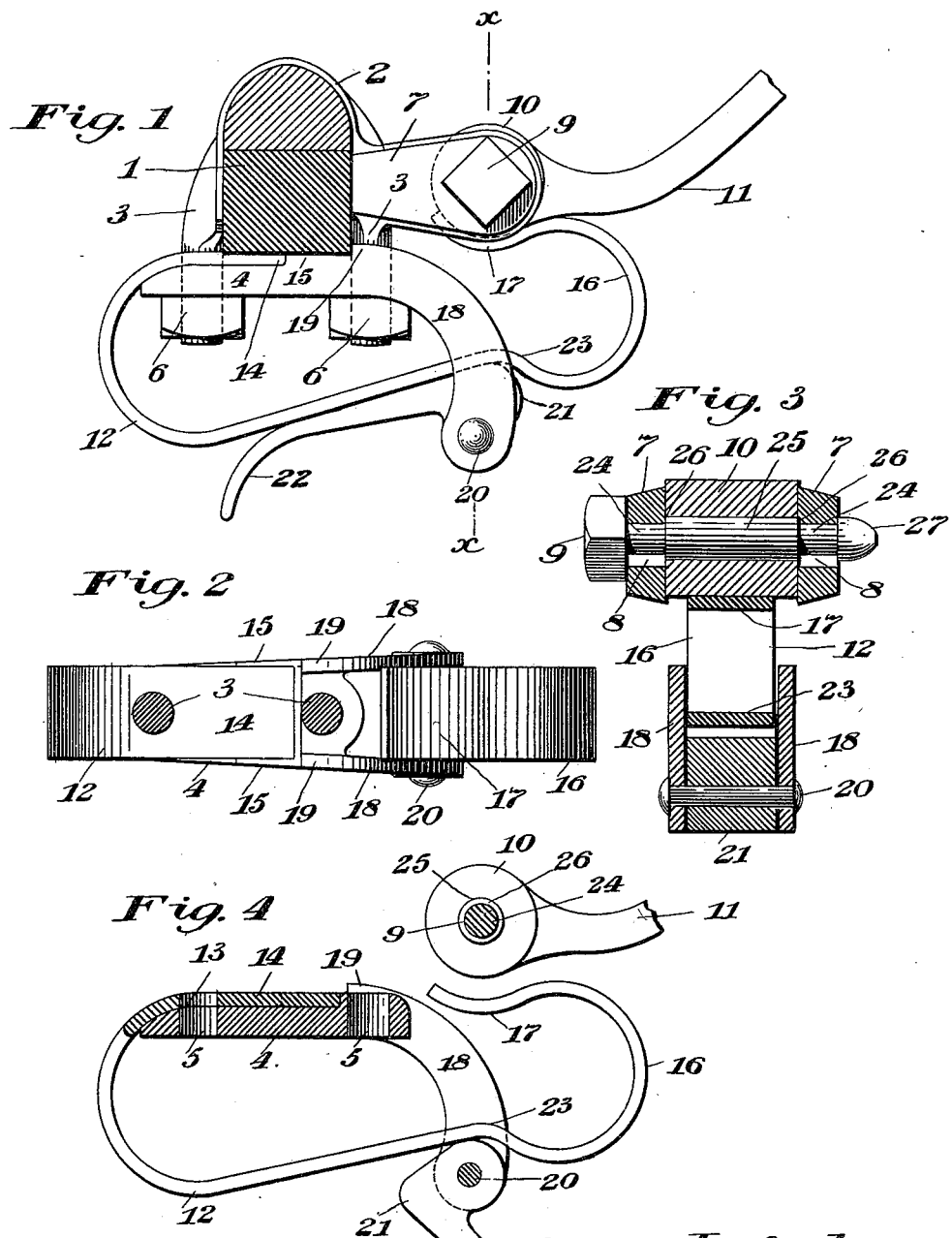
Witnesses
J D Thorne
Robert M. Ross.
Inventor
William Knapp,
by
John Elias Jones,
his Attorney.

UNITED STATES PATENT OFFICE.

WILLIAM KNAPP, OF CINCINNATI, OHIO.

THILL-COUPLING.

SPECIFICATION forming part of Letters Patent No. 625,956, dated May 30, 1899.

Application filed February 27, 1899. Serial No. 706,921. (No model.)

*To all whom it may concern:*

Be it known that I, WILLIAM KNAPP, a citizen of the United States, residing at Cincinnati, in the county of Hamilton and State of Ohio, have invented certain new and useful Improvements in Thill-Couplings; and I do declare the following to be a full, clear, and exact description of the invention, such as will enable others skilled in the art to which it appertains to make and use the same, reference being had to the accompanying drawings, and to the figures of reference marked thereon, which form a part of this specification.
This invention relates to certain improvements in couplings for the thills or shafts of vehicles, and has for its object to provide a device of this character of a simple and inexpensive nature which shall be strong and durable in construction and provided with improved means for taking up wear and preventing rattling of the parts and also for locking the coupling bolt or pin which connects the thill-iron with the clip-lugs in place when the vehicle is in use, the construction of said holding means being such as to permit the thills or shafts to be conveniently and quickly uncoupled or shifted when desired.

The invention consists in certain novel features of the construction, combination, and arrangement of the several parts of the improved thill-coupling whereby certain important advantages are attained and the device is made simpler, cheaper, and otherwise better adapted and more convenient for use, all as will be hereinafter fully set forth.

The novel features of the invention will be carefully defined in the claims.

In the accompanying drawings, which serve to illustrate the invention, Figure 1 is a side view showing the improved thill-coupling, the axle being seen in section; and Fig. 2 is a plan view showing the clip tie-plate and antirattler-spring carried thereby, the clip-bolts being shown in section. Fig. 3 is a sectional view taken vertically through the coupling in the plane indicated by line $x$ $x$ in Fig. 1. Fig. 4 is a fragmentary sectional side elevation of the improved coupling, the clip being omitted and the antirattler-spring being shown in relaxed position.

In the views, 1 indicates the axle, and 2 indicates the clip carried by the same and formed in the ordinary manner with bolts 3 3, depending on opposite sides of the axle and passed through the tie-plate 4, which extends under the axle 1 and is formed with apertures 5 5 for the passage of said bolts 3. The extremities of the bolts 3 carry nuts 6 beneath the clip-tie 4, whereby the clip is held in position on the axle. The clip 2 is formed with forwardly-projecting lugs 7, spaced apart to receive between them the eye 10 of the thill-iron 11, said eye being held pivotally to the clip-lugs 7 by means of a headed coupling bolt or pin 9, which passes through apertures 8 in the lugs 7, as clearly shown in Fig. 3.

12 indicates the antirattler-spring, made by preference from a strip of flat spring metal, having its rear end bent to form an upper arm 14, which extends forwardly over the rear end of the clip-tie 4 and between said tie and the axle 1 and has its extremity engaged in a seat formed on the upper face of the clip-tie between lateral upturned ribs or flanges 15 on said tie, as clearly shown in Fig. 2. The said upper arm 14 of the spring is also formed with an aperture 13, adapted for alinement with the rear opening 5 of the clip-tie 4 and through which the rear clip-bolt 3 is passed. In this way it will be seen that when the parts are assembled the spring 12 will be securely held in place by reason of its arm 14 being engaged between the clip-tie 4 and axle 1 in the seat or socket of the clip-tie and with the rear bolt 3 of the clip, and said spring will be held against lateral movement by reason of said arm being held by the bolt 3 and by the ribs or flanges 15 of the clip-tie.

The lower arm of the spring 12 is of greater length than the upper arm thereof and is arranged to extend forwardly under the clip tie-plate 4 in front of the axle 1 and has its front end bent or curved upwardly upon itself to form an eye or loop 16. The extremity 17 of said lower arm is extended rearwardly under the eye or socket 10 of the thill-iron, being curved to fit the under side thereof and being adapted by frictional engagement with said eye when the spring is placed under tension to hold the eye and the coupling bolt or pin 9 against rattling in the lugs 7 of the clip.

The forward end of the clip tie-plate 4 is formed with integral forks or arms 18, which are curved to extend forward and downwardly, as shown in the drawings, on opposite sides of the lower arm of the spring 12, and said forks or arms 18 are alined with ribs or flanges 19, formed on the upper face of the forward end of said tie-plate 4 in front of the axle 1 and serving to strengthen the plate and also to facilitate the attachment of the plate to the axle, against which their rear ends abut.

The curved arms or forks 18 of the tie-plate serve to prevent lateral movement of the longer lower arm of the spring 12, which is held between them, and serve to strengthen the device and prevent breakage or displacement of the spring from sidewise movement, and the extremities of said arms or forks 18 are tied or connected together by a bolt or pin 20, whereon is pivoted a cam-lever 21, adapted for engagement with the under side of the lower arm of the spring 12 and provided with an arm or handle 22, by means of which it may be conveniently turned to place the spring under tension. The said lower arm of the spring is formed, as clearly shown in Figs. 1 and 4, with a bent or curved part 23, adapted to be engaged by the cam 21, so that when the arm or handle 22 is turned in position to engage the under side of the spring the cam will move in engagement with said curved part 23 and hold the spring under tension.

The bolt or pin 9, which connects the eye of the thill-iron 11 with the clip-lugs 7, is formed with reduced cylindrical portions 24, adapted to correspond in position, when the bolt or pin is in place, with the lugs 7 of the clip, and between said reduced portions the said bolt or pin is formed with an enlarged cylindrical part or body 25, extending across the space between the lugs 7 and whereon the thill-iron eye is adapted to move pivotally. Annular shoulders 26 are also formed at the ends of the said enlarged body portion 25 of the bolt or pin, said shoulders being adapted for engagement, as shown in Fig. 3, against the inner surfaces of the lugs 7 above the apertures 8 therein, when the spring 12 is placed under tension, in such a manner as to prevent the bolt or pin from being withdrawn from the lugs. The bolt or pin is also formed with a rounded or tapered end 27 to facilitate its insertion in the openings of the thill-eye and clip-lugs.

In operation when the bolt or pin has been placed in position to couple the thills or shafts to the clip-lugs the cam-lever 21 is moved pivotally from the position shown in Fig. 4 to that shown in Fig. 1 and by engagement with the under side of the lower arm of the antirattler-spring 12 will act to place said spring under tension, the cam being held in place against accidental movement to relax the spring by engagement of its handle 22 under the spring when said cam has passed a perpendicular between its pivotal center and the spring. The extremity 17 of the longer lower arm of the spring when said spring is placed under tension will bear upwardly against the under side of the eye 10 of the thill-iron, so as to lift said eye and the bolt or pin 9 and to engage the shoulders 26 of the bolt or pin with the inner surfaces of the clip-lugs 7, so as to hold the bolt or pin securely against withdrawal from the lugs and also to prevent rattling of the parts. The shoulders 26 being annular and the parts 24 and 25 of the bolt or pin being made cylindrical, it will be obvious that the coupling of the thills or shafts is geatly facilitated, it being unnecessary to adjust the pin or bolt to any particular position in order that the shoulders may be caused to properly engage the lugs 7. The annular form of the shoulders 26 also increases the life of the device, since the wear which would come upon the top side of the bolt or pin were said shoulders formed only at that point is distributed about the entire periphery of the bolt or pin and throughout the entire surface of said shoulders.

Since, as will be obvious, the operation of the cam-lever, as above described, to place the spring under tension also acts to lift the thill-eye and coupling bolt or pin 9, whereby said bolt or pin is locked against accidental displacement, it will be seen that the uncoupling or shifting of the thills or shafts when desired is greatly facilitated, since the reverse movement of the cam-lever will act to again lower the thill-eye and coupling bolt or pin, so as to place the pin or bolt in position for convenient removal from the openings 8 of the clip-lugs 7. The extremity 17 of the lower arm of the antirattler-spring 12 is, as shown in dotted lines in Fig. 1, engaged between the lugs 7 of the clip back of the eye 10, so as to prevent it from lateral movement while the spring is under tension.

From the above description it will be seen that the improved thill-coupling is of an extremely simple and inexpensive nature and is light, strong, and durable in construction, so as to especially adapt it for use, the coupling pin or bolt being securely held in place when the spring is under tension and the forward end of the spring being housed and protected against injury by engagement between the clip-lugs 7 and the arms or forks 18 of the clip-tie 4. Moreover, the construction is such that the thills or shafts may be quickly and conveniently uncoupled or shifted, it being only necessary to move the cam 21 to release the spring 12, whereupon the thill-eye 10 and pin or bolt 9 will be lowered out of locked position to enable the said bolt or pin to be conveniently withdrawn from the lugs.

It will also be apparent from the above description that the improved thill-coupling constructed according to my invention is capable of considerable modification without material departure from the principles and spirit of the invention, and for this reason I do not wish to be understood as limiting myself to the precise form and arrangement of the several parts herein set forth.

Having thus described my invention, I claim—

1. In a thill-coupling, the combination of a clip having lugs, a thill-iron having an eye pivotally held in said lugs, a clip tie-plate having spaced arms projecting beneath the thill-iron, a spring extending under the clip tie-plate between the arms thereof and held by said arms against lateral movement, said spring having its forward part adapted for engagement with the thill-eye and means carried by said arms of the clip tie-plate for placing the spring under tension, substantially as set forth.

2. In a thill-coupling, the combination of a clip having lugs, a thill-iron having an eye pivotally held in said lugs, a clip tie-plate having spaced arms projecting beneath the thill-iron, a spring extending under the clip tie-plate between the arms thereof and held by said arms against lateral movement, said spring having its forward part engaged with the thill-eye, a pin connecting the arms of the clip-tie below said spring and a cam carried by said pin between the arms and beneath said spring and arranged, when moved, to place the spring under tension, substantially as set forth.

3. In a thill-coupling, the combination of a clip having lugs, a thill-iron having an eye, a clip-tie, an antirattler-spring extending forward from the clip-tie and having its forward part arranged for engagement with the thill-iron to press the same in a direction transverse to the axis of its eye, a coupling bolt or pin passed through the clip-lugs and through the eye of the thill-iron, and provided with locking mechanism controlled by the movement of the thill-iron in a direction transverse to the axis of its eye, and means for placing said spring under tension to hold the parts against rattling and also to move the thill-iron to operate the locking mechanism of the coupling bolt or pin, substantially as set forth.

4. In a thill-coupling, the combination of a clip having lugs, a thill-iron having an eye, a coupling bolt or pin adapted for insertion in the clip-lugs and thill-eye and when inserted, capable of movement in a direction transverse to its axis and having shoulders to engage the lugs and lock the bolt or pin against removal from the lugs when said bolt or pin is moved transversely of its axis and means to move the thill-eye and bolt or pin to engage the shoulders with the lugs to hold said coupling bolt or pin against removal from the clip-lugs, substantially as set forth.

5. In a thill-coupling, the combination of a clip having lugs, a thill-iron having an eye, a coupling bolt or pin having shoulders to engage the clip-lugs, an antirattler-spring adapted for engagement with the thill-eye, and means for placing the spring under tension, said spring being arranged, when placed under tension, to move the thill-eye and coupling bolt or pin to engage the shoulders thereof with said clip-lugs to lock said bolt or pin against removal, substantially as set forth.

6. In a thill-coupling, the combination of a clip having lugs, a thill-iron having an eye, a coupling bolt or pin having a cylindrical body portion adapted for insertion and turning movement in the clip-lugs and thill-eye and formed with annular shoulders adapted for engagement with the lugs of the clip, an antirattler-spring adapted for engagement with the thill-eye, and means for placing said spring under tension, said spring being arranged, when placed under tension, to move the thill-eye and coupling bolt or pin to engage the shoulders thereof with said clip-lugs to lock said bolt or pin against removal, substantially as set forth.

7. In a thill-coupling, the combination of a clip having lugs, a thill-iron having an eye, a coupling bolt or pin adapted for insertion in the clip-lugs and thill-eye, means controlled by the upward movement of the thill-eye to lock said bolt or pin against removal, an antirattler-spring arranged for engagement with the thill-eye at the under side thereof, and means for placing said spring under tension, said spring, when placed under tension, being arranged to move the thill-eye upward to lock the coupling bolt or pin, and when relaxed to permit the thill-eye to fall, whereby the coupling bolt or pin is unlocked and brought in position for removal to facilitate the shifting of the thills, substantially as set forth.

8. In a thill-coupling, the combination of a clip having lugs, a thill-iron having an eye, a coupling bolt or pin adapted for insertion in the clip-lugs and thill-eye, said thill-iron being adapted for movement between the clip-lugs in a direction transverse to the axis of the coupling bolt or pin, means, controlled by the movement of the thill-iron transverse to the coupling-bolt axis, for locking said coupling bolt or pin against endwise removal from the clip-lugs, and means for moving said thill-iron to lock said bolt or pin, substantially as set forth.

In testimony whereof I affix my signature in presence of two witnesses.

WILLIAM KNAPP.

Witnesses:
W. P. BIDDLE,
JOHN ELIAS JONES.